United States Patent [19]

Supalla

[11] 4,153,237
[45] May 8, 1979

[54] HYDRAPNEUMATIC SUSPENSION UNIT AND VALVING STRUCTURE

[76] Inventor: Steven A. Supalla, 3545 SW. 124th Ave., Beaverton, Oreg. 97005

[21] Appl. No.: 737,852

[22] Filed: Nov. 1, 1976

[51] Int. Cl.² ............................................. F16F 9/34
[52] U.S. Cl. .................................. 267/64 R; 188/314
[58] Field of Search ............... 188/314, 302, 297, 315, 188/306, 303; 267/64 R, 65 R, 124, 34; 16/51, 66

[56] References Cited

U.S. PATENT DOCUMENTS

| | | | |
|---|---|---|---|
| 1,807,422 | 5/1931 | Manzel | 188/314 X |
| 1,967,169 | 7/1934 | Armstrong | 188/303 |
| 2,342,381 | 2/1944 | Thornhill | 267/34 |
| 3,062,330 | 11/1962 | Lyon, Jr. | 188/314 X |
| 3,419,114 | 12/1968 | Rumsey | 188/306 |
| 3,817,566 | 6/1974 | Keijzer et al. | 188/314 X |

FOREIGN PATENT DOCUMENTS

| | | | |
|---|---|---|---|
| 564526 | 2/1958 | Belgium | 188/314 |
| 1013975 | 8/1957 | Fed. Rep. of Germany | 188/314 |
| 1195615 | 12/1968 | Fed. Rep. of Germany | 188/314 |
| 11726 of | 1895 | United Kingdom | 267/64 R |

Primary Examiner—George E. A. Halvosa
Attorney, Agent, or Firm—Oliver D. Olson

[57] ABSTRACT

A hydrapneumatic suspension unit for a vehicle has a first and and a second chamber separated by valve assembly in communication with both chambers for controlling the flow of liquid therebetween. The first said chamber is liquid filled and includes a slidably mounted piston connected by a linkage to the road wheel. The second chamber includes a first compartment containing the liquid and a second compartment containing a compressible medium, wherein the first and second compartments are separated by a floating piston or a diaphragm member to permit compression and restoration of the compressible medium. The valve assembly includes a damping valve, a low-restriction check valve for permitting one-way flow of liquid from the first to the second chamber, and a damping bypass valve for enabling quick return of liquid from the second chamber to the first chamber. Interconnection may be provided to establish equalization between two or more suspension units.

3 Claims, 5 Drawing Figures

HYDRAPNEUMATIC SUSPENSION UNIT AND VALVING STRUCTURE

BACKGROUND OF THE INVENTION

Hydrapneumatic suspensions are known which have one or more chambers filled with a liquid, typically an oil, and a chamber filled with a gas, usually compressed nitrogen. Communication between the chambers has heretofore been provided by fixed orifices and check valves which require that the temperature and viscosity of the liquid be within narrow limits for proper operation of the suspension.

One major problem apparent in prior art two-chamber devices, including those with double-acting pistons, is that return flow of liquid in an unloading state is restricted, so that the return stroke of the piston to an extended position is unnecessarily impeded. For example, in a motorcycle going over an abrupt bump, the forward inertia of the vehicle together with the slow response of the suspension results in the rear wheel being airborne from the apex of the bump. This action results in a loss of traction and ride stability. Further, if a second bump is encountered by the aforementioned rear wheel before the suspension can recover, the shock resulting therefrom is not fully absorbed by the suspension unit. If the damping factor of the suspension unit is adjusted to improve the response of such unit, an undesirable upward thrust upon the frame of the vehicle is produced during recovery of the unit.

SUMMARY OF THE INVENTION

In accordance with the present invention, a hydrapneumatic suspension unit for a vehicle includes a first chamber and a second chamber separated by valve means which provides communication between the two chambers. A piston, which is connected by a linkage, such as a swing arm or the like, to the road wheel, is slidably mounted in the first chamber, such first chamber being substantially cylindrically shaped and filled with a liquid adapted to be displaced in accordance with the movements of such piston.

The second chamber, which behaves as an accumulator, comprises a first compartment and a second compartment separated by separating means, which may suitably be a floating piston or a thin flexible diaphragm member. The first mentioned compartment is liquid filled and the second mentioned compartment contains compressible means for absorbing a shock transmitted thereto.

The valve means operatively interconnects the first and second chambers to permit liquid to flow therebetween in accordance with displacing forces exerted by the piston in the first chamber and the compressible means in the second chamber. Such valve means includes a check valve, a damping valve, and a damping bypass valve.

In operation, the check valve permits liquid displaced by inward movement of the piston to flow therethrough from the first chamber to the first compartment of the second chamber, transmitting the force of the piston to the compartment separating means, thereby further compressing the compressible means in the second compartment.

The damping valve permits a restricted flow of liquid between chambers to prevent violent rebounding of the system, or pitching of the vehicle frame, by damping the return flow when necessary, as is well known in the art.

After a shock has been absorbed and the system is unloading, such as when the road wheel is airborne, the damping bypass valve permits liquid accumulated in the first compartment of the second chamber to flow into the first chamber as it is displaced by the restoring force of the compressible means, bypassing the damping valve and allowing the piston to quickly move toward an extended position as it follows the road wheel downward. When downward travel of the road wheel is impeded, the piston slows its downward movement, causing an increase of pressure in the first chamber which in turn causes the damping bypass valve to close, preventing further flow of liquid therethrough. At this point, the damping valve allows slower movement of the piston until normal height is attained.

If the vehicle is a motorcycle with the suspension unit acting between the wheel and frame, it can be appreciated that the wheel will be kept on the ground regardless of the terrain. The results are a smoother ride than heretofore attained, greater stability and control of the vehicle, and continuous traction. Also, in cornering, sideways slippage of the wheel is minimized due to the maintained contact of the wheel with the ground.

Such a valving arrangement further serves to reduce unnecessary heat buildup in the suspension unit. Heat is usually caused by liquid forced through small orifices, such as through the damping valve. It can be appreciated that the hereinabove mentioned check valve and damping bypass valve serve to permit the majority of interflow of liquid between chambers. Such check valve and damping bypass valve are made to be as large as practical to pass the liquid therethrough with a minimum restriction.

The compressible means contained within the second compartment of the second chamber may suitably be a compressed gas or a mechanical spring as utilized in prior art devices, or such compressible means may preferably be a combination of both gas and a mechanical spring. Such a combination overcomes the disadvantages of both the bottoming effect at high force attendant with the linear spring rate of mechanical spring that is sized to provide reasonable compliance at low forces, and the high sensitivity to low forces attendant with the non-linear spring rate of the gas spring by providing a progressive spring rate which closely approximates an ideal force versus suspension deflection curve. Thus the spring rate is substantially linear for low forces, and increases non-linearly as the force increases so that bottoming cannot occur.

The physical arrangement of the suspension unit is preferably a "folded" configuration, or inverted U-shape, wherein the aforementioned first and second chambers are contained respectively within first and second parallel cylinders which are adjoined by the valve means. This configuration not only provides a compact unit, but serves to direct the reaction thrust against the original impact thrust such as imparted by the wheel hitting a bump. For example, as the piston is forced upward in the first cylinder, a corresponding downward force is imparted to the compressible means in the second cylinder. In a like manner, the upward force exerted by the compressible means is matched by a corresponding downward force exerted on the piston.

Interconnecting lines may be provided between two or more suspension units, facilitating matching of units, maintaining equal pressures therebetween, and facilitating filling the units with liquid. Two or more interconnected units has the advantage of providing at least limited performance in the event of partial failure, such as liquid or gas leakage, of one of the units. As an extension of this concept, a modular suspension unit may be provided wherein a plurality of aforementioned first cylinders containing pistons are interconnected with a single remote shared valve means and second cylinder assembly.

It is therefore one object of the present invention to provide a hydrapneumatic suspension unit which increases ride stability and control of a vehicle regardless of terrain.

It is another object to provide a hydrapneumatic suspension unit having a novel valve arrangement between first and second liquid-filled chambers to provide rapid dynamic response to changes in pressure therein caused by the action of a piston connected by linkage to a road wheel by permitting rapid displacement of liquid from one of said chambers to the other.

It is a further object to provide a hydrapneumatic suspension unit in which heat buildup is minimized so that the type of liquid utilized therein and cooling means therefor are non-critical.

It is an additional object to provide a hydrapneumatic suspension unit which acts to keep a road wheel in contact with the ground so that traction is continuous in turns and over rough terrain.

It is yet another object to provide a hydrapneumatic suspension unit in which a compressible gas and mechanical spring are utilized in combination to provide a tunable ideal progressive spring rate and preload.

It is yet a further object to provide a hydrapneumatic suspension unit in which reaction thrust is diverted downward to minimize jolting and upward movement of a vehicle when encountering bumps and rough terrain.

It is yet an additional object to provide a hydrapneumatic suspension unit of modular design.

Other objects and advantages of the present invention will become apparent to those skilled in the art upon a reading of the following detailed description when taken in conjunction with the drawings.

DRAWINGS

DETAILED DESCRIPTION OF THE DRAWINGS

Figure 1:
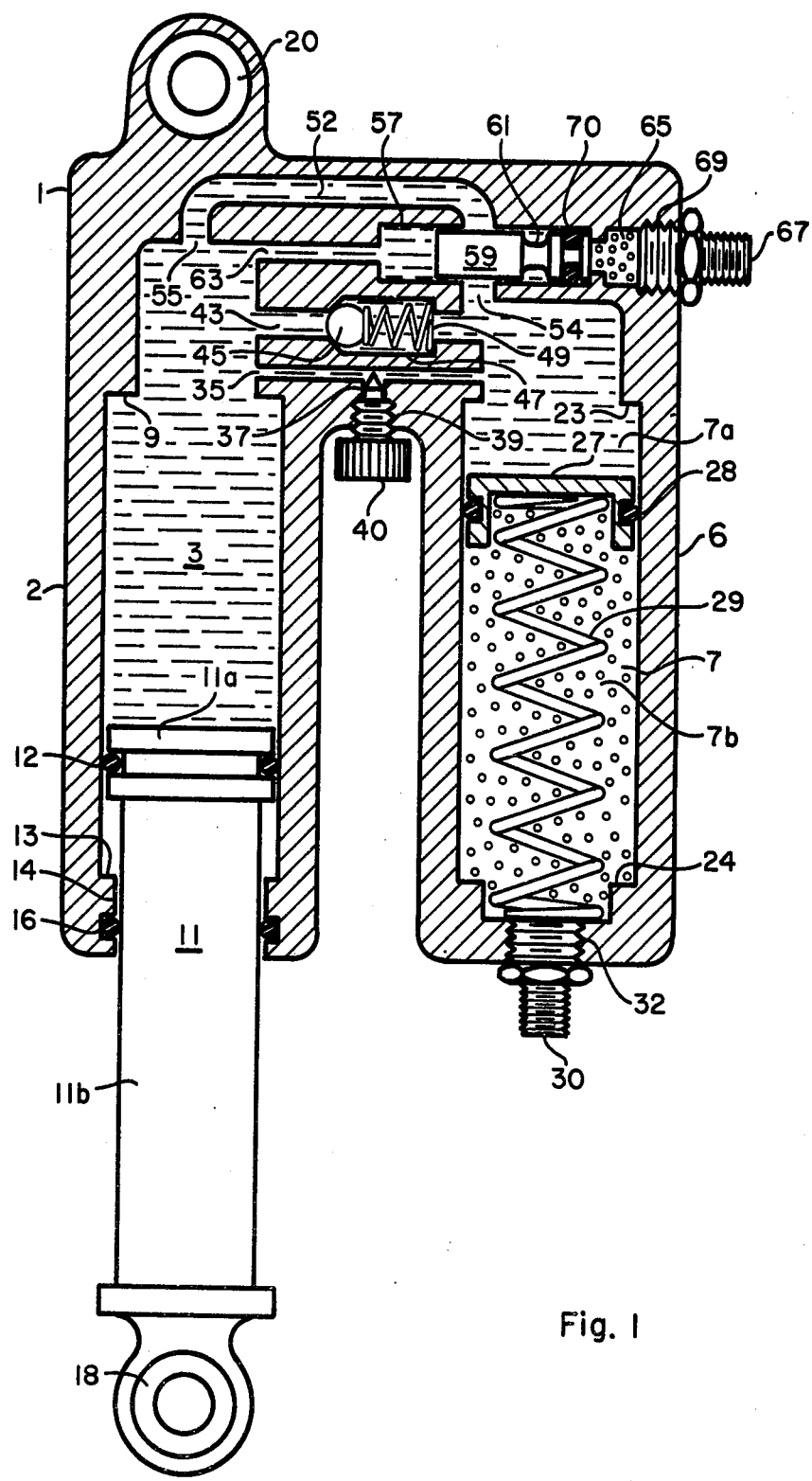
FIG. 1 is a schematic view of a suspension unit in a statically loaded condition.
Figure 2:
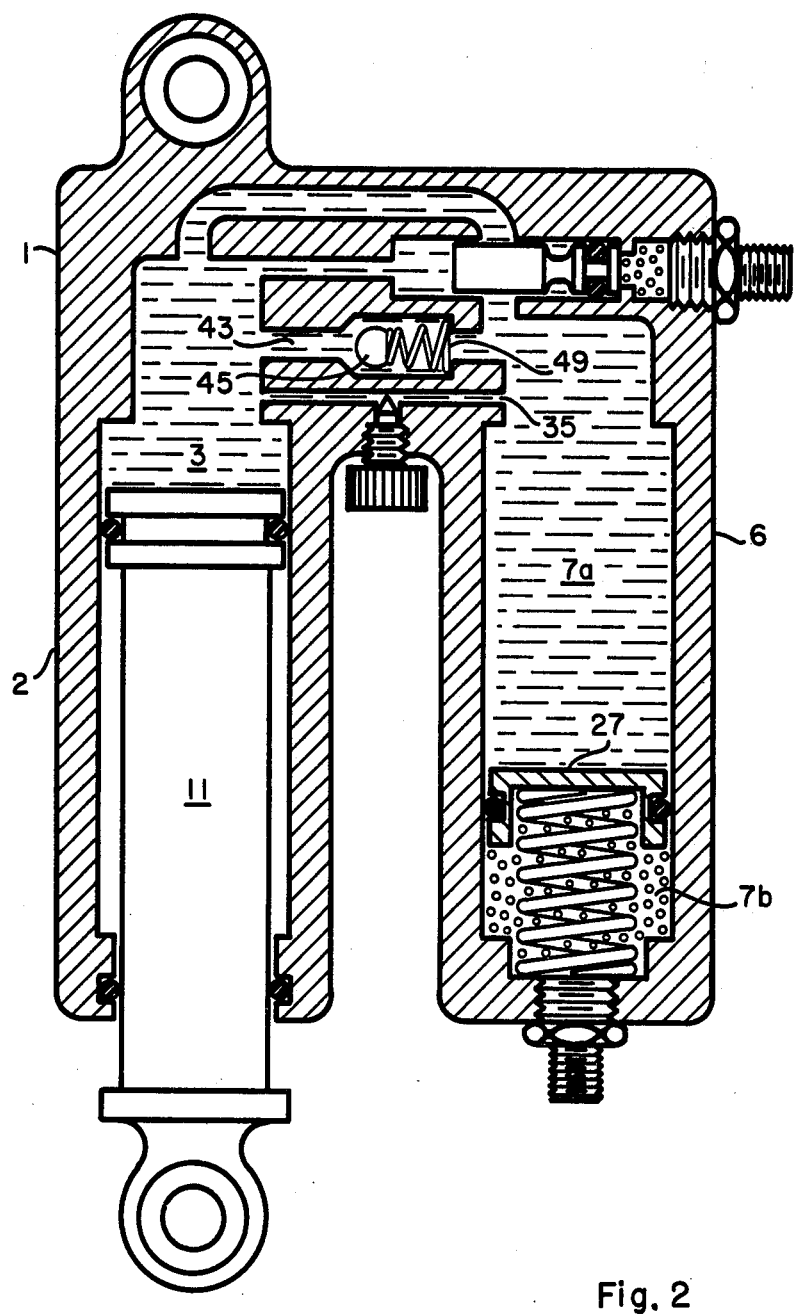
FIG. 2 is a similar view of the device when it is dynamically loading.
Figure 3:
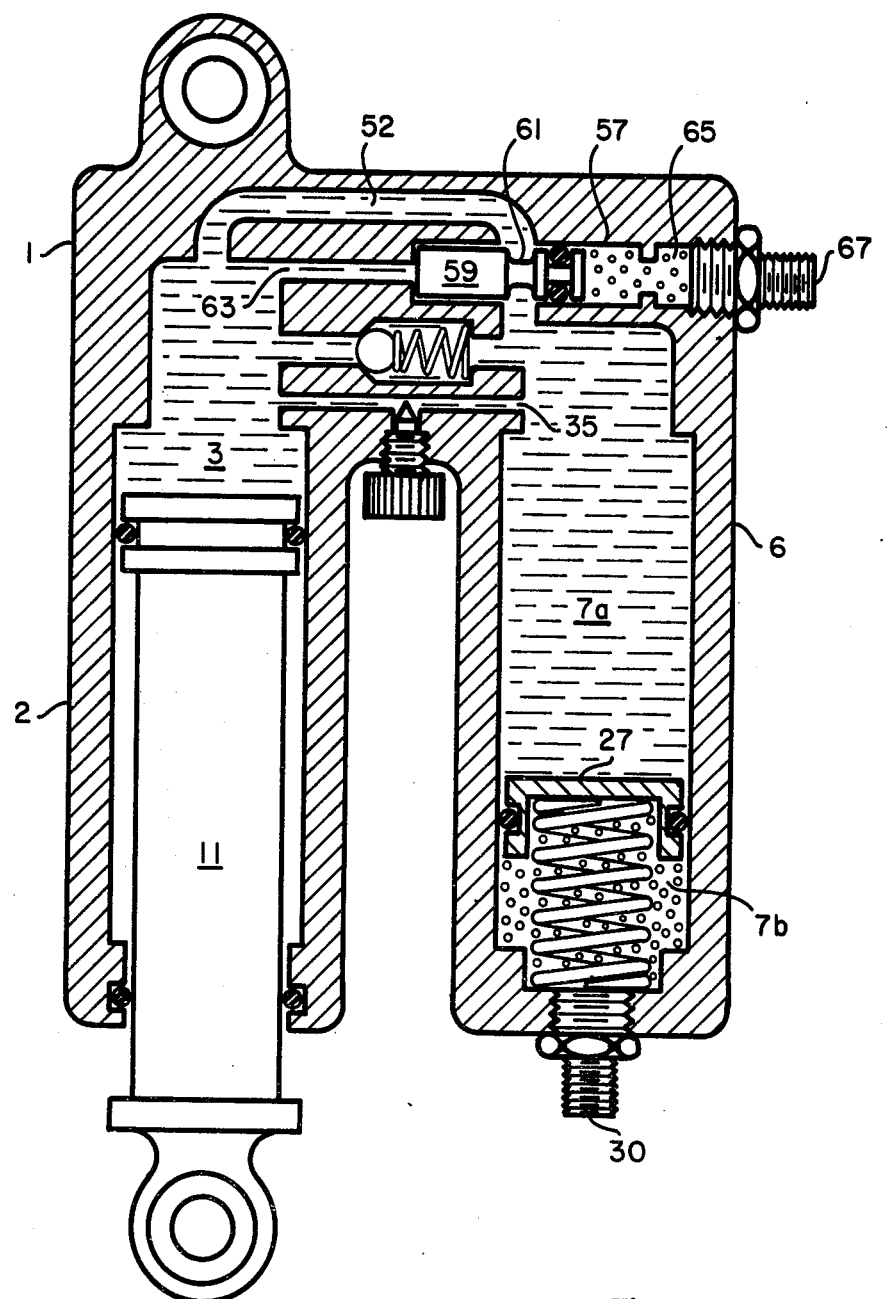
FIG. 3 is a similar view of the device when it is dynamically unloading.

Referring to FIGS. 1, 2, and 3 of the drawings, there is shown a schematic representation of a cross section of a hydrapneumatic suspension unit in accordance with the present invention in which FIG. 1 shows the unit in the statically loaded state, FIG. 2 shows the unit in a dynamically loading state, and FIG. 3 shows the unit in a dynamically unloading state. Like elements have like reference numerals throughout the drawings.

In FIG. 1, a housing 1 has a first cylinder 2 having a first cylindrical bore or chamber 3 which is formed axially therein, and a second cylinder 6 having a second cylindrical chamber 7 which is formed axially therein.

The first chamber 3 is closed at its upper end by a cylinder head 9. A piston 11 is axially slidably received in the first chamber 3. The piston 11 consists of a piston head 11a having a peripheral seal 12 disposed thereabout and a piston rod 11b. The piston rod 11b projects from the piston head 11a and extends externally from the first cylinder 2 through a lower end wall 13 of the first cylinder 2. The piston rod 11b is slidably received in a bearing 14 formed in the end wall 13 of the first cylinder 2. A dust seal 16 is provided around the periphery of the bearing 14. The piston rod 11b has at its lower end a lower mounting eye 18 through which the piston rod 11b is articulately connected to wheel supporting means such as a swing arm of a vehicle (not shown) or the wheel axle itself. The housing 1 carries a similar upper mounting eye 20 serving as a means for articulately connecting the housing 1 with a vehicle frame.

The second chamber 7 is closed at its upper end by an upper wall 23 and at its lower end by a lower end wall 24. The second chamber 7 is separated into an upper compartment 7a and a lower compartment 7b by suitable separating means, which may be a free floating piston 27 axially slidably received therein and having a peripheral seal 28 disposed thereabout. It is understood that other conventional separating means may be utilized in place of floating piston 27, such as a flexible bladder-like diaphragm member attached to the inner wall of second chamber 7, or a piston attached to a flexible rolling-type diaphragm member.

The first chamber 3 and upper compartment 7a of second chamber 7 are filled with a hydraulic fluid, which may suitably be a synthetic oil. The lower compartment 7b of second chamber 7 may suitably contain a compressible gas, such as nitrogen under pressure, and a compressible coil spring 29 which may be axially received between the free floating piston 27 and lower end wall 24. A nipple 30 is engaged into a threaded hole 32 in the lower end wall 24 of second cylinder 6 to permit charging the lower compartment 7b with gas. Alternatively, either gas or such a coil spring could be utilized separately to provide a compressible means; however, a combination of the two is preferable because of the ideal progressive spring rate feature provided thereby, as will be discussed later in connection with FIG. 4.

A compression flow channel 43 is provided between first chamber 3 and upper compartment 7a to connect first cylinder 2 with second cylinder 6. A check valve shown in the form of a spring-loaded ball 45 is arranged in an enlarged axial opening 47 in the channel 43. In the statically balanced condition of FIG. 1, the pressures in chamber 3 and upper compartment 7a are equal, and such ball valve 45 is urged into the closed position by a spring 49. An increase in pressure in the first chamber 3 caused by upward movement of piston 11 as shown in FIG. 2 is sufficient to overcome the pressure exerted by spring 49, opening the check valve and permitting liquid to flow unrestricted from chamber 3 to upper compartment 7a via channel 43. As the pressure in compartment 7a approaches that of chamber 3, ball valve 45 closes under pressure from spring 49, preventing escape of liquid from upper compartment 7a back into chamber 3 via channel 43. In the dynamically unloading state, such as shown in FIG. 3, the prevailing pressure in compartment 7a aids in maintaining closure of the check valve.

A damping channel 35 between upper compartment 7a and chamber 3 is provided, connecting cylinder 6 with cylinder 2. Restricted passage means may be provided in the form of a needle valve 37 engaged into a threaded hole 39 in housing 1 transverse to the axis of channel 35. The channel 35 is intended to permit the liquid in compartment 7a to flow into chamber 3 in a restricted fashion so as to dampen the rebound of the suspension unit when the road wheel is in contact with the ground. The needle valve 37 is provided with a thumb screw head 40 to permit a desired setting of the needle valve 37 to provide the desired damping depending upon the viscosity of the liquid. Alternatively, a predetermined fixed orifice may be substituted if adjustability is not required.

A damping bypass channel 52 is provided between the upper compartment 7a and chamber 3, connecting the second cylinder 6 with the first cylinder 2 through an opening 54 in the upper end wall 23 of second cylinder 6 and an opening 55 in the cylinder head 9 of first cylinder 2. There is a cylindrical bypass valve cavity 57 disposed on an axis transverse to the axis of opening 54 of channel 52, and a shuttle valve 59 is adapted for axial sliding movement within the cavity 57. The shuttle valve 59, which may suitably be fabricated of a lightweight material such as acetal plastic, includes an annular groove 61. The left side of the valve cavity 57 is connected through a pressure-sensing channel 63 to the first chamber 3. At the right side of the valve cavity 57 is a small chamber 65 containing a compression means, which may suitably be compressed gas as shown, or a spring (not shown). A threaded nipple 67 is engaged into a threaded hole 69 in the housing 1 adjacent the chamber 65 for charging the chamber 65 with a compressed gas, for application thereto of an external reference pressure, as will be explained later. A peripheral seal 70, or other sealing means may be disposed about the shuttle valve 59 to prevent leakage of liquid or compressed gas between the annular groove area and the chamber 65. In statically and dynamically loaded conditions of piston 11, the prevailing pressure in chamber 3 acts on the shuttle valve 59 through the pressure-sensing channel 63 to hold the shuttle valve 59 in its right-hand position as shown in FIGS. 1 and 2 against the pressure in chamber 65 to thereby block passage of liquid through channel 52. When the pressure in chamber 3 drops below the pressure in chamber 65, such as when the system is unloading and piston 11 is falling downward, the shuttle valve 59 snaps to its left-hand position as shown in FIG. 3, placing the annular groove 61 directly in line with the opening 54 of channel 52 to permit rapid passage of liquid through channel 52 from upper compartment 7a to chamber 3.

The opening provided by the damping channel 35 and damping valve 37 is typically much smaller than the openings provided by either channels 43 or 52 and their respective associated valves so that in compression and unloading operating states the majority of the liquid flows through the check valve and damping bypass valve respectively.

The suspension unit operates as follows:

With reference to FIG. 1, the suspension unit is maintained in a balanced, substantially statically loaded condition, such as when the vehicle is standing still or travelling over a substantially smooth surface. The pressure in first chamber 3 is substantially the same as that in upper compartment 7a so that both the ball-type check valve 45 and shuttle valve 59 are closed, blocking passage therethrough of the liquid. The pressure of the compressible means in lower compartment 7b is such that the free floating piston 27 is near the top third of cylinder 6 while the piston 11a connected to the road wheel is near the bottom third of cylinder 2. These relative positions of pistons 27 and 11a of course depend on the weight of the vehicle, passengers, and payload, and may be adjusted by varying the pressure of the gas in compartment 7b. The amount of liquid in chamber 3 and upper compartment 7a and the gas pressure in lower compartment 7b may be predetermined to provide optimum performance.

Under a condition in which the road wheel experiences an increased dynamic load, such as occurs when it strikes a bump, the suspension unit is forced to contract in the axial direction with piston 11 moving upward in the first cylinder 2, as shown in FIG. 2. The increased pressure in chamber 3 overcomes the pressure of spring 49, opening the ball-type check valve 45 to permit rapid and unrestricted flow of liquid into upper compartment 7a as the upward force of piston 11 is transmitted to the free-floating piston 27. The floating piston 27 moves downward, attempting to equalize the forces applied above and below it further compressing the gas and spring 29 in lower compartment 7b, storing therein the energy produced by upward movement of the road wheel, thereby absorbing the shock. When the piston 11 completes its upward movement and the pressures in the chambers 3 and 7a equalize, the ball-type check valve 45 closes under pressure from spring 49.

In conditions where the road wheel continues over a higher level surface after initially hitting a rise and causing the suspension unit to contract as hereinabove described, the pressure of the compressible means in lower compartment 7b will exert an upward force on floating piston 27, causing liquid to flow through the damping channel 35, causing a gradual downward movement of piston 11 with respect to the housing 1, and a corresponding extension of the suspension unit toward the statically loaded position of FIG. 1.

In conditions where the system is suddenly unloading, such as the road wheel coming off the bump hereinabove mentioned, or in curves where the wheel may attempt to slip sideways, the wheel no longer pushes up on piston 11, decreasing the pressure in the first chamber 3. See FIG. 3. The decrease in pressure is sensed by the shuttle valve 59 through the sensing channel 63, so that when the pressure of the compressing means in chamber 65 is greater than the pressure in chamber 3, the shuttle valve 59 snaps to the left, aligning the annular groove 61 with the opening 54 of bypass channel 52. Liquid is then "dumped" from upper compartment 7a to the chamber 3 through the bypass channel 52 under the force exerted upward from floating piston 27 due to the compressed gas and spring 29 in lower compartment 7b. Thus the road wheel follows the downward slope of the terrain and remains on the ground so that traction is continuous and slippage of the wheel on the surface is reduced to a minimum. When the movement of piston 11 is impeded because of the wheel reaching the ground surface, which may or may not be the original level, an increase in pressure is produced in chamber 3, which is correspondingly sensed by the shuttle valve 59 through the sensing channel 63. When the pressure of chamber 3 exceeds that of chamber 65, the shuttle valve 59 snaps to its right-hand position, preventing further flow of liquid through the bypass channel 52. The liquid in upper compartment 7a will then flow through the damping channel 35 until the pressures in chamber 3 and upper compartment 7a equalize, at which point the suspension unit attains its statically loaded height. As can be appreciated, the actual use of damping is minimized under dynamic operating conditions so that heat buildup in the suspension unit is minimized.

Figure 4:
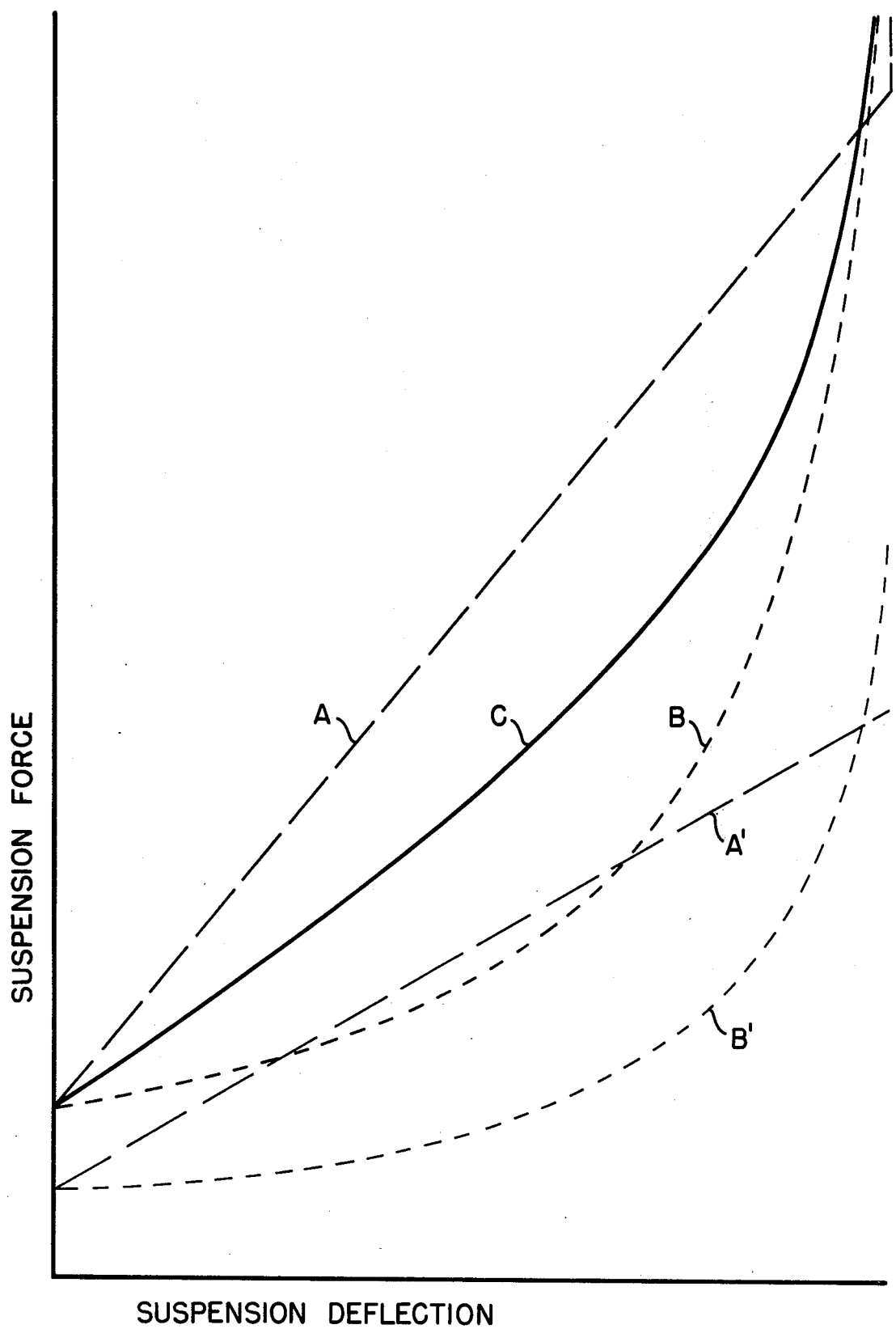
FIG. 4 is force versus deflection graph showing a comparison of spring constants.

The advantage of a gas-mechanical spring combination as a compressible means in lower compartment 7b can be seen in FIG. 4. In the graph of FIG. 4, the suspension force exerted by the piston 11 is shown on the vertical axis while the suspension deflection, or travel of piston 11, is shown on the horizontal axis. The broken line A represents the spring rate of a mechanical spring. As the force is increased, the piston eventually reaches its limit of travel, at which point line A continues in the vertical direction. This is known as bottoming. The spring is normally made stiffer to prevent most bottoming but this will produce an unsatisfactory choppy ride ove smaller bumps. Dashed curve B represents the spring rate of compressed gas. No bottoming occurs as the force is increased; however, note that at low force the curve is very shallow and that a very small change in force produces a large deflection. The solid curve C represents the spring rate of the gas-mechanical spring combination, and is actually the sum of components A' and B'. From curve C, it can be seen that an ideal progressive spring rate is provided and that the inherent disadvantages of the individual components are eliminated.

Figure 5:
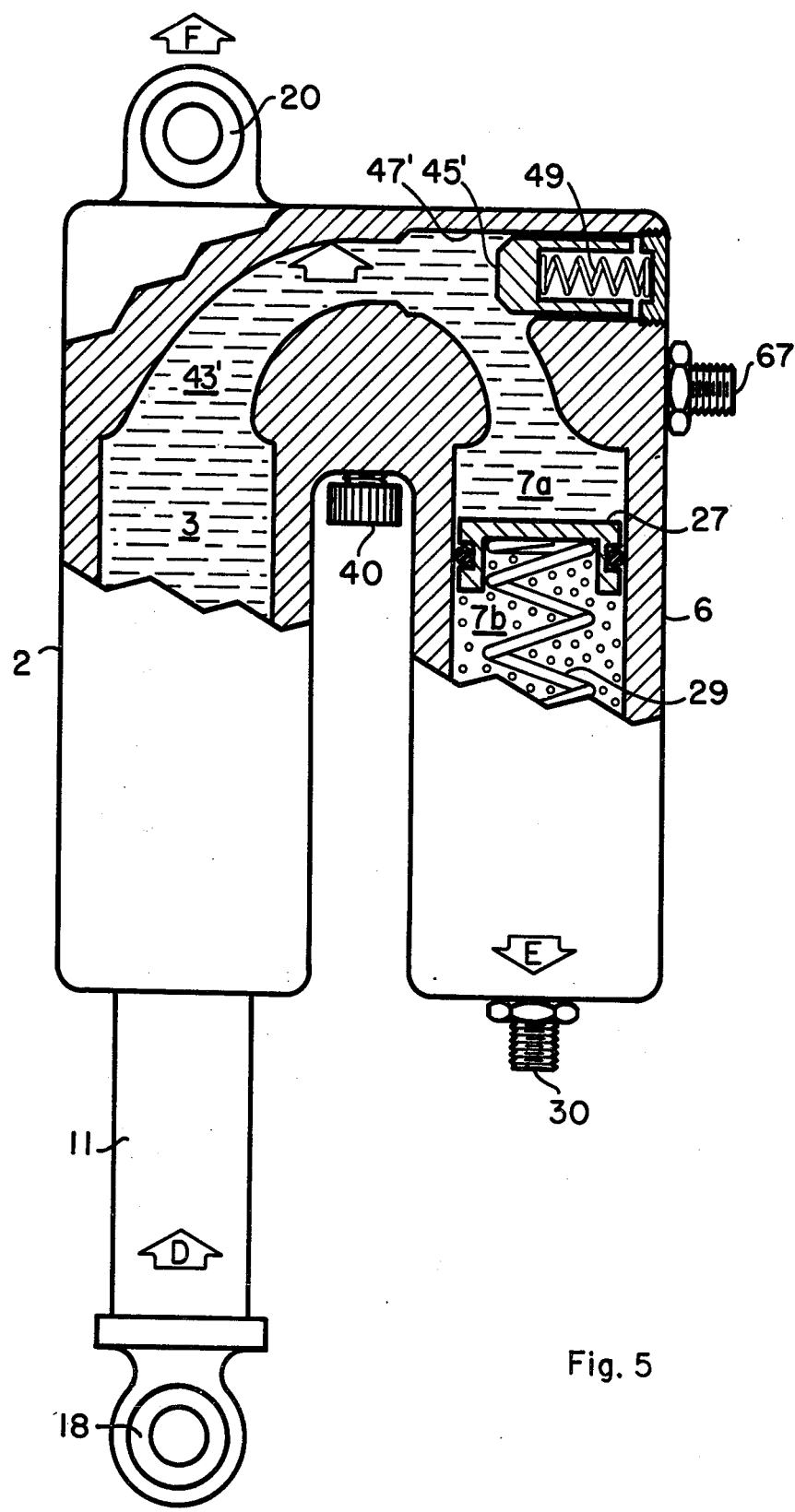
FIG. 5 is a cutaway view of a suspension unit showing an optimized valving arrangement.

FIG. 5 shows an optimized valving arrangement which provides an extremely low-restriction inverted U shape to direct substantially all of the reactive thrust downward. The details of the lower portions of cylinders 2 and 6, including pistons 11 and 27, are the same as previously described. A streamlined channel 43' is provided between chamber 3 and upper compartment 7a to connect first cylinder 2 with second cylinder 6. As sleeve-type check valve 45' is disposed in a cylindrical cavity 47' and is slidable axially therein. This check valve operates substantially the same as the ball-type check valve described earlier, and is shown in the open position as piston 11 is moving upward, causing the pressure in chamber 3 to overcome the spring pressure of spring 49 as the liquid flows unrestricted into upper compartment 7a, forcing piston 27 downward. Because of the streamlined channel 43', the upward force (D) exerted by piston 11 is diverted downward (E) through piston 27 with negligible loss. Consequently, the net force (F) transmitted upward to the vehicle frame is substantially zero. It can be appreciated that a damping channel (not shown) and a damping bypass channel and valve (not shown) may be provided in a similar manner with the bypass channel streamlined to provide a turbulence-free, unrestricted return of liquid from upper compartment 7a to chamber 3.

If two or more suspension units are utilized, the corresponding nipples 67 of the units may be replaced by adaptive hollow fittings and be connected together through a pressurizing line (not shown) to establish a reference pressure for the units. This is particularly advantageous on motorcycles, where two units may be connected between a road wheel and the frame, mounted on either side of such vehicle. Thus both unit may coact substantially identically to provide symmetrical shock absorbing capacity. Similarly, the chambers 3 of two or more suspension units may be interconnected by adaptive hollow fittings inserted into the walls or cylinder heads of cylinders 2 or 6 and pressurized lines. This interconnection of suspension units serves two useful functions. First, it facilitates filling the units with liquid because such filling may be done remotely from the suspension units, and the liquid will tend to equalize between the units, giving each an equal volume. Second, in the event of fluid leakage due to partial failure of one of the units, liquid will flow from the sound units to the disabled one, resulting in substantially equal performance from all the units. In a like manner, the nipples 30 may be replaced by adaptive hollow fittings to permit interconnection of lower compartments 7b between substantially identical units.

While a schematicized representation of the preferred embodiment of the invention has been shown and described, it will be obvious to anyone skilled in the art that the present invention may be put into practice in many forms and that many modifications may be made thereto without departing from the spirit of the invention. For example, while a single housing is shown, the suspension may be made up of separate components, such as separate cylinders 2 and 6 and a single block containing the valving means, and assembled together in a final unit. Also, multiple cylinders 2 may be connected to a remote shared valving means and cylinder 6. In addition to the valving means shown it will be obvious to those having ordinary skill in the art to substitute other types of check valves. Further, in applications permitting a long suspension unit, the cylinders may be arranged in axial alignment with the valving means disposed therebetween, with the attendant loss in advantages.

I claim:

1. A hydrapneumatic suspension unit, comprising:
   (a) a first chamber,
   (b) a piston movable longitudinally in the first chamber,
   (c) a piston rod extending from one side of the piston through one end of the first chamber,
   (d) the piston end of the chamber containing an hydraulic liquid, there being no restricted flow of said liquid to opposite sides of the piston to cause restricted movement of the piston,
   (e) a second chamber,
   (f) movable separator means in the second chamber dividing the latter into a first compartment containing the same liquid as the first chamber and a second compartment containing compressible means for resiliently resisting movement of the separator means in the direction of the second compartment,
   (g) check valve means between the piston end of the first chamber and first compartment for permitting rapid flow of liquid only from the first chamber to the first compartment,
   (h) damper valve means between the piston end of the first chamber and the first compartment for permitting restricted flow of liquid from the first compartment to the first chamber,
   (i) bypass valve means between the piston end of the first chamber and the first compartment for permitting flow of liquid from the first compartment to the first chamber at a rate substantially greater than the rate of flow through the damper valve means,
   (j) one end of the bypass valve means communicating with the piston end of the first chamber and the liquid contained therein, and
   (k) resilient means engaging the end of the bypass valve means opposite the end communicating with the first chamber and providing a reference pressure independent of the liquid pressure in the first compartment and the only pressure opposing the liquid pressure in the first chamber, whereby when the liquid pressure in the first chamber is lower than the reference pressure provided by the resilient means the bypass valve means is moved to open communication between the first chamber and first compartment, and when the liquid pressure in the first chamber is higher than the reference pressure provided by the resilient means the bypass valve means is moved to close communication between the first chamber and first compartment.

2. The suspension unit of claim 1 wherein the resilient means comprises a compressed gas.

3. The suspension unit of claim 1 including a bypass passageway communicating the first chamber and first compartment with each other, and the bypass valve means comprises a shuttle valve intercepting said bypass passageway and movable to open and close said bypass passageway when the liquid pressure in the first chamber is lower and higher, respectively, than the reference pressure provided by the resilient means.

* * * * *